United States Patent
Nachimuthu et al.

(10) Patent No.: US 7,555,671 B2
(45) Date of Patent: Jun. 30, 2009

(54) SYSTEMS AND METHODS FOR IMPLEMENTING RELIABILITY, AVAILABILITY AND SERVICEABILITY IN A COMPUTER SYSTEM

(75) Inventors: Murugasamy Nachimuthu, Hillsboro, OR (US); Singaravelan Nallasellan, Bangalore (IN); Mohan J. Kumar, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 520 days.

(21) Appl. No.: 11/513,872

(22) Filed: Aug. 31, 2006

(65) Prior Publication Data
US 2008/0115138 A1    May 15, 2008

(51) Int. Cl.
*G06F 11/00* (2006.01)
(52) U.S. Cl. .............................................. 714/1; 714/3
(58) Field of Classification Search ...................... 714/1, 714/3, 4, 39, 47, 48, 53
See application file for complete search history.

(56) References Cited

U.S. PATENT DOCUMENTS

| | | | |
|---|---|---|---|
| 6,393,582 B1 * | 5/2002 | Klecka et al. ................. | 714/11 |
| 6,658,470 B1 * | 12/2003 | deBardelaben ............... | 709/224 |
| 6,697,973 B1 * | 2/2004 | Baumeister et al. ........... | 714/55 |
| 6,948,094 B2 * | 9/2005 | Schultz et al. ................ | 714/15 |
| 2007/0061634 A1 * | 3/2007 | Marisetty et al. .............. | 714/48 |
| 2008/0082881 A1 * | 4/2008 | Szydlowski ................. | 714/731 |
| 2008/0163256 A1 * | 7/2008 | Khanna et al. .............. | 719/318 |

* cited by examiner

*Primary Examiner*—Dieu-Minh Le
(74) *Attorney, Agent, or Firm*—Schubert Osterrieder & Nickelson PLLC; Jeffrey S. Schubert (57) ABSTRACT

Embodiments include systems and methods for processing Reliability, Availability and Serviceability (RAS) events in a computer system. Embodiments comprise processing critical events in a first portion of a Management Interrupt (MI) period. The MI period is chosen to be not greater than a maximum tolerable Operating System (OS) latency period. If time remains in a current MI period after processing critical events, the system then processes non-critical events during the time remaining in the current MI period. If at the end of the current MI period, some non-critical events remain to be processed, a subsequent MI period is scheduled to process the remaining non-critical events.

20 Claims, 8 Drawing Sheets

SYSTEMS AND METHODS FOR IMPLEMENTING RELIABILITY, AVAILABILITY AND SERVICEABILITY IN A COMPUTER SYSTEM

FIELD

The present invention is in the field of runtime repair and reconfiguration of computer systems. More particularly, the invention is in the field of handling events to enable reliability, availability and serviceability of computer components.

BACKGROUND

Reliability, Availability and Serviceability (RAS) events in a computer system may generally comprise a collection of events pertaining to the maintainability of the computer system. Execution of these RAS events enables runtime repair and reconfiguration of the system. RAS events include memory copy, memory hot plug, and processor hot plug events as well as power management events. The execution of these events requires an interrupt of Operating System (OS) operations for a processor to spend time executing the RAS events. This creates an OS code latency. Too long a period of OS code latency results in degradation of performance apparent to a user of the system. For example, too long a period of OS code latency may result in degradation of audio or video. Thus, a problem arises how to process each and every RAS event without exceeding some maximum tolerable OS code latency.

BRIEF DESCRIPTION OF THE DRAWINGS

Aspects of the invention will become apparent upon reading the following detailed description and upon reference to the accompanying drawings in which like references may indicate similar elements.

DETAILED DESCRIPTION OF EMBODIMENTS

The following is a detailed description of embodiments of the invention depicted in the accompanying drawings. The embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Embodiments include systems and methods for processing Reliability, Availability and Serviceability (RAS) events in a computer system. Embodiments comprise processing critical events in a first portion of a Management Interrupt (MI) period. The MI period is chosen to be not greater than a maximum tolerable Operating System (OS) latency period. If time remains in a current MI period after processing critical events, the system then processes non-critical events. If at the end of the current MI period, some non-critical events remain to be processed, a subsequent MI period is scheduled to process the remaining non-critical events.

Figure 1:
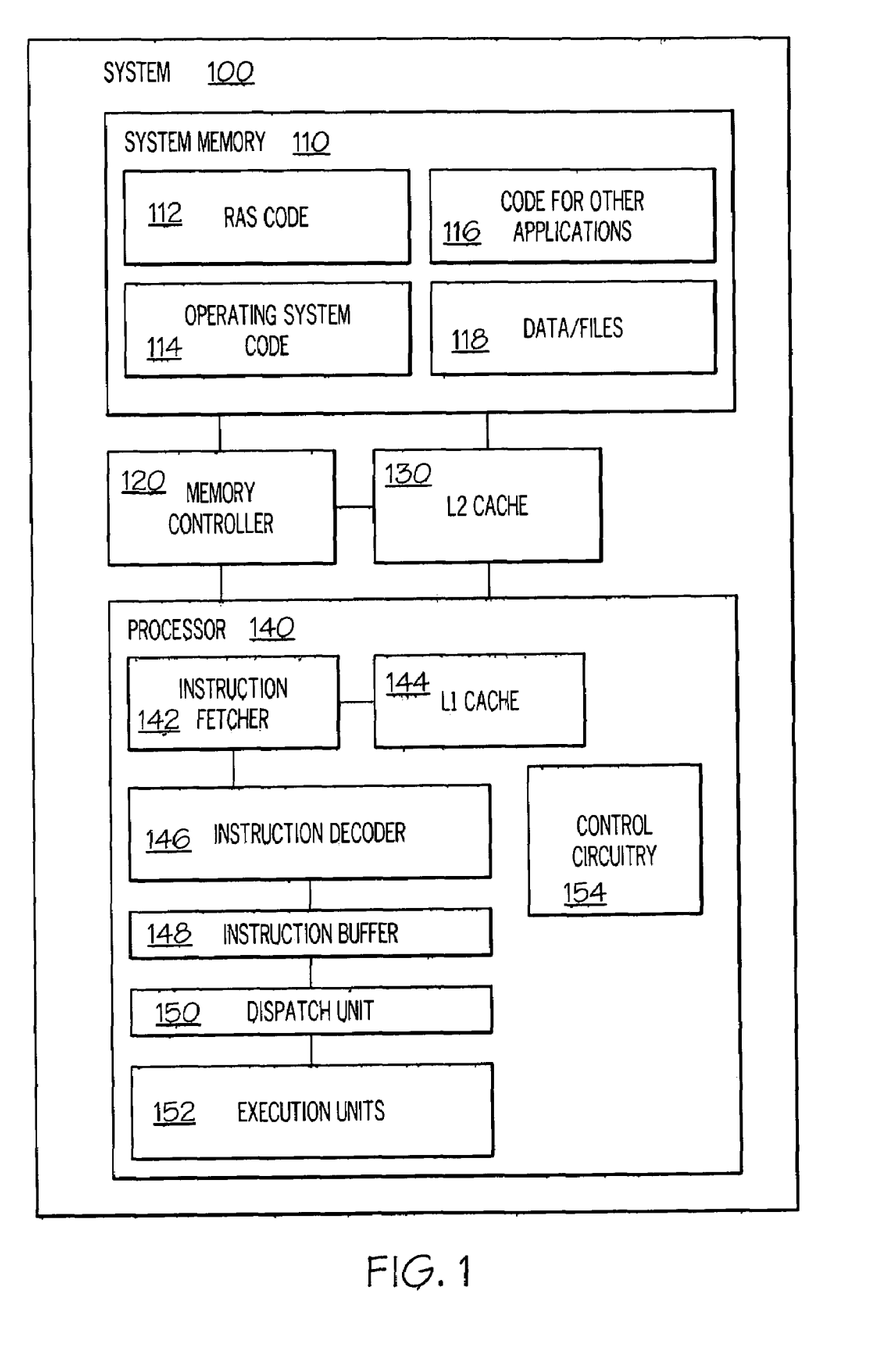
FIG. 1 depicts an embodiment comprising a system memory, a memory controller, and a processor.

Thus, embodiments comprise apparatus, methods, and computer code for processing critical and non-critical events, and distinguishing there between. In a computer system or server there is at least one processor capable of performing Operating System (OS) computer code operations and performing RAS computer code operations. These operations are performed by the processor executing the instructions of the computer code. FIG. 1 shows an embodiment of a system 100 with a processor or Central Processing Unit (CPU) 140 for executing OS code and RAS code. System 100 comprises a system memory 110, a memory controller 120, an L2 cache 130, and a processor 140.

System memory 110 comprises a hard disk drive memory, Read-Only Memory (ROM), and Random Access Memory (RAM). System memory 110 stores RAS code 112, Operating System (OS) code 114, Basic Input-Output System (BIOS) code (not shown), and code for other application programs 116. In one embodiment, RAS code is separate from BIOS code. In another embodiment, RAS code is part of BIOS code. And in yet another, embodiment, RAS code can be contained partially within, and partially without the BIOS code. System memory 110 also stores data and files 118. The OS code 114, and applications code 116, are typically stored on a hard drive, whereas BIOS code and RAS code is typically stored in ROM.

The processor 140 receives instructions for executing RAS events through the action of memory controller 120. Memory controller 120 effectuates transfers of instructions and data from system memory 110 to L2 cache 130 and from L2 cache 130 to an L1 cache 144 of processor 140. Thus, data and instructions are transferred from a hard drive to L2 cache near the time when they will be needed for execution in processor 140. L2 cache 130 is fast memory located physically close to processor 140. Instructions may include load and store instructions, branch instructions, arithmetic logic instructions, floating point instructions, etc. L1 cache 144 is located in processor 140 and contains data and instructions received from L2 cache 130. Ideally, as the time approaches for a program instruction to be executed, the instruction is passed with its data, if any, first to the L2 cache, and then as execution time is near imminent, to the L1 cache.

Processor 140 thus fetches and executes RAS code instructions. These instructions cause the processor to perform RAS operations. These operations comprise obtaining a current system time upon entry of execution of RAS instructions in response to a Management Interrupt (MI) signal. The MI signal may be a Service Management Interrupt (SMI) signal associated with a computer such as an Intel XEON system, or may be a Platform Management Interrupt (PMI) signal associated with a server such as an Intel Itanium system. The operations the processor performs include classifying events as critical or non-critical. The operations further comprise identifying a time limit for an MI period. Critical and non-critical events may be performed during an MI period. The MI period is chosen to be less or not greater than a maximum tolerable OS code latency.

During an MI period, OS code performance by processor 140 is suspended so that RAS code can be executed. If OS code performance by processor 140 is delayed for too long, there will be degradation in apparent performance. For example, audio or video updates may be delayed, thereby reducing the quality of the audio or video as perceived by a user of the system. An MI period is therefore calculated to be not greater than a maximum tolerable period of OS code latency.

During a first portion of, or during the entire duration of, an MI period, RAS code 112 execution causes the processor to process critical events. RAS code 112 causes the processor to identify an amount of remaining time in a current MI period after completion of the processing of critical events. This time, if long enough, will be allocated to handling non-critical events. If not all non-critical events can be performed in what remains of the MI period after handling critical events, then remaining non-critical events will be performed during a next scheduled MI period. Thus, the RAS code causes the processor to compute time limits and schedule subsequent MI periods when not all events to be processed can be processed in a single MI period. Upon completion of instructions during an MI period, processor 140 is reallocated to performing OS instructions until the next MI period.

Thus, processor 140 receives and executes RAS instructions 112 to perform RAS functions. Accordingly, in addition to on-chip level 1 cache 144 for storing instructions and data, processor 140 also comprises an instruction fetcher 142, instruction decoder 146, instruction buffer 148, a dispatch unit 150, execution units 152 and control circuitry 154. Instruction fetcher 142 fetches RAS instructions from memory. To achieve this, instruction fetcher 142 maintains a program counter and fetches instructions from L1 cache 130. The program counter of instruction fetcher 142 comprises an address of a next instruction to be executed. Instruction fetcher 142 also performs pre-fetch operations. Thus, instruction fetcher 142 communicates with a memory controller 214 to initiate a transfer of instructions from the system memory 110, to instruction cache L2 130, and to L1 instruction cache 144. The place in the cache to where an instruction is transferred from system memory 110 is determined by an index obtained from the system memory address. Accordingly, RAS event instructions to be executed by processor 140 are fetched into the L1 instruction cache 144.

Instruction fetcher 142 retrieves RAS event instructions passed to L1 instruction cache 144 and passes them to an instruction decoder 146. Instruction decoder 146 receives and decodes the instructions fetched by instruction fetcher 142. The decoded instructions specify which execution unit 152 will perform the instruction and will specify what function the execution unit will perform. An instruction buffer 148 receives the decoded instructions from instruction decoder 146. Instruction buffer 148 comprises memory locations for a plurality of instructions. Instruction buffer 148 may reorder the order of execution of instructions received from instruction decoder 146. Instruction buffer 148 therefore comprises an instruction queue to provide an order in which instructions are sent to a dispatch unit 150.

Dispatch unit 150 dispatches RAS instructions received from instruction buffer 148 to execution units 152. In a superscalar architecture, execution units 152 may comprise load/store units, integer Arithmetic/Logic Units, floating point Arithmetic/Logic Units, and Graphical Logic Units, all operating in parallel. Dispatch unit 150 therefore dispatches instructions to some or all of the executions units to execute the RAS instructions simultaneously. Execution units 152 comprise stages to perform steps in the execution of RAS instructions received from dispatch unit 150. Data processed by execution units 152 are storable in and accessible from integer register files and floating point register files not shown. Thus, instructions are executed sequentially and in parallel.

Thus, processor 140 receives RAS instructions 112 from system memory, decodes these instructions, and directs its execution units to perform the functions prescribed by the instructions. The RAS instructions direct the processor to determine an MI starting time, an MI duration, a time when the processing of critical events comes to an end, a time remaining in the MI period for processing non-critical events, and an MI period end time. The RAS instructions also comprise instructions for handling the RAS event. During a first MI period, the processor is directed to execute instructions that cause the processor to process critical events. In a subsequent period, if there is time remaining in the MI period, the processor is directed to execute instructions that cause the processor to process non-critical events.

FIG. 1A also shows control circuitry 154 to perform a variety of functions that control the operation of processor 140. For example, an operation controller within control circuitry 154 interprets the OPCode contained in an instruction and directs the appropriate execution unit to perform the indicated operation. Also, control circuitry 154 may comprise a branch redirect unit to redirect instruction fetcher 142 when a branch is determined to have been mispredicted. Control circuitry 154 may further comprise a flush controller to flush instructions younger than a mispredicted branch instruction.

System 100 further comprises other components and systems not shown in FIG. 1A, including, RAM, peripheral drivers, a system monitor, a keyboard, flexible diskette drives, removable non-volatile media drives, CD and DVD drives, a pointing device such as a mouse, etc. System 100 may be a personal computer, a workstation, a server, a mainframe computer, a notebook or laptop computer, etc.

Accordingly, processor 140 executes the instructions prescribed by RAS code 112 to process critical and non-critical events. In one embodiment, there are multiple processors. In a multi-processor system, one, some or all of the processors will execute OS code and/or applications program code. In one embodiment, one of the processors is assigned to perform RAS functions under the direction of RAS code 112. Thus, when an MI signal is generated, the one processor assigned to perform RAS functions will begin to do so. In one embodiment, the operation of all other processors is suspended. In another embodiment, operations of one, some or all of the other processors may be suspended or may be continued.

For example, one RAS function that may be performed is a processor hot plug, in which one of the processors is to be removed and replaced with a new processor. In one embodiment, a processor that is not to be replaced is designated as the RAS processor to handle the execution of the RAS event. The processor hot plug event may be classified as two critical events: one being the preparation for removal of the processor to be replaced, and the other being the setting up of the replacement processor once it is inserted in to its socket. Thus, processing the first event may require storing the state of the processor to be removed during a first MI period and processing the second event may require setting the replacement processor to the stored state during a subsequent MI period.

Another RAS function that may be performed is a memory hot plug, in which a memory that may be failing is replaced by a new memory. This may be separated into a series of sequential copy events, each copy event in the series classified as a separate non-critical event. Each copy event comprises copying a unit of data from one memory unit to another. The amount of memory content to be transferred may be large and copying may take several seconds. Thus, each task is broken down in to non-critical subtasks that may be scheduled over more than one MI period.

Figure 2:
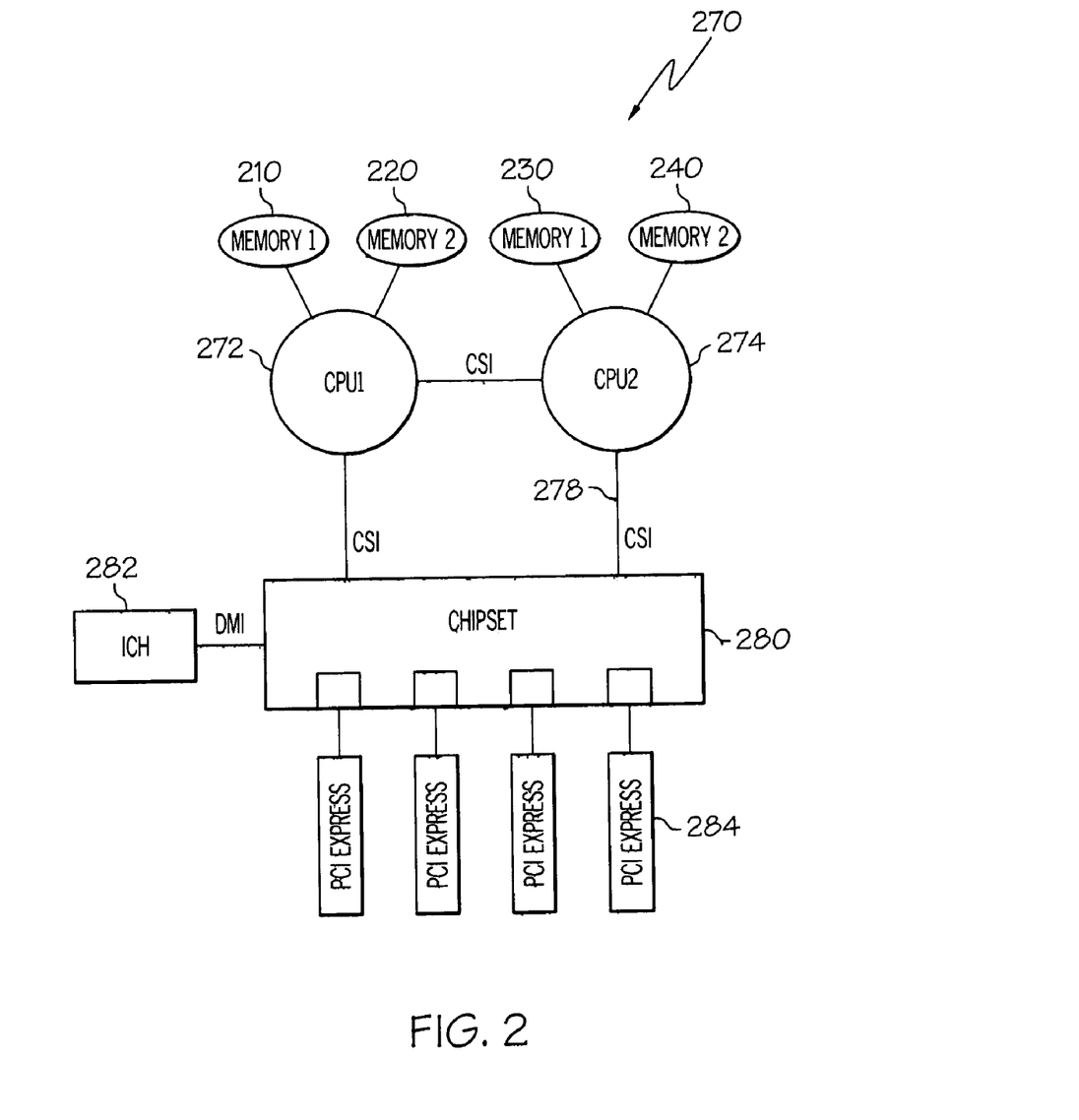
FIG. 2 depicts an embodiment of a multi-processor system with a plurality of memory units associated with each processor.

FIG. 2 shows a simplified block diagram of a multi-processor computer system 270 comprising multiple CPUs structured as shown in FIG. 1. Thus, each CPU 272, 274 comprises its own instruction fetcher, instruction decoder, instruction buffer, dispatch unit, control circuitry and execution units. Further, each CPU 272, 274 is linked to a first and second memory 210, 220 and 230, 240 associated with the respective CPU 272 and 274. Any one or more of the central processing units may be capable of executing RAS instructions. Each CPU may be linked to another by a Common System Interface (CSI) 278. A CSI is a system interface providing point-to-point interconnection in place of the traditional shared front-side bus (FSB). A CSI also links each CPU with an Input/Output Hub (IOH) chipset 280. IOH 280 provides communications functions to facilitate communications between CPU 272, 274 and peripheral devices such as a keyboard, mouse, video circuitry, audio circuitry, network interface card, etc. CPU 272, 274 also performs memory management functions such as memory add, memory spare, and memory mirroring.

IOH chipset 280 is connected by a Direct Media Interface (DMI) to an Input/Output (I/O) Controller Hub (ICH) 282. ICH 282 is a highly-integrated, multi-functional I/O Controller Hub that provides the interface to a Peripheral Component Interconnect (PCI) 284 bus and integrates many of the functions needed in today's Personal Computer (PC) platforms. IOH chipset 280 is thus connected to a plurality of PCI express units 284 which allow connections to PCI end point devices, including video, storage, and network interface devices. Thus, IOH chipset 280 provides for communications between a CSI link and a PCI link, each with its own communications protocol.

When system 270 is started, BIOS code initializes the system and the system is then under control of the OS code. During operation under control of the OS code, any one or more of a series of Reliability, Availability and Serviceability (RAS) events may occur. These events include Processor Add, Processor Remove, Memory Remove, Memory Migrate, etc. Processor Add is the process of adding a processor to a running system either to increase the number of processors or to replace a processor to be removed. Processor Remove is the process of removing a processor from operation. Memory Add refers to the process of adding a physical memory to a running system. Memory Add may be: performed to increase the amount of memory available to a processor. Memory Spare is the process of dedicating a spare memory to a processor. The spare memory is not used until another memory unit needs servicing. In this case, the contents of the memory requiring service are migrated to the spare memory unit and the memory requiring service is removed for service. This memory can then be replaced by adding a new memory inserted into the socket from which the memory to be replaced has been removed. Memory Mirroring refers to the process of storing a copy of the contents of one memory unit into a second mirroring memory unit to provide data redundancy. Memory Migration is the process of copying the contents of one memory unit to another memory unit.

For example, one may initially allocate Memory 2 (220) of CPU 1, 272, as a spare memory unit. In the course of operation, Memory 1 (210) of CPU 1 272 may indicate memory errors. Memory errors may be detected by a checksum operation performed by the CPU 1 272 silicon/chipset. When memory errors of Memory 1 (210) reach a threshold, CPU 1 272 selects Memory 2 (220) of CPU 1 272 and transfers the contents of Memory 1 (210) to Memory 2 (220). The failing Memory 1 (210) is then removed for servicing. This process of replacing a failing memory may be processed as a plurality of non-critical copy events performed in one or more MI periods. Thus, in one embodiment, a memory copy event may be parsed into a plurality of sub-events, each sub-event comprising copy of a bit, byte, word or more of memory from one memory unit to a second memory unit. In another embodiment, each memory 1 and 2 may be connected to both processors.

In order to perform a memory migration operation comprising copying the contents of one memory unit to another memory unit, a Management Interrupt (MI) is generated by IOH chipset 180. The MI is a signal to a pin of one of the processors 272, 274 or message to the processors 272, 274 that causes the processor to interrupt execution of the OS code and begin execution of the RAS code. The processor that receives the interrupt and executes the RAS code is referred to as the monarch processor, whereas the other processors in the system are referred to as application processors (AP). If all the processors receive an MI interrupt, then one processor out off all the processors is selected as the monarch, and the other processors will be AP. The RAS code identifies the interrupt reason as a memory migration and identifies the source memory (Memory 1) and the target memory (Memory 2). The RAS code performs the necessary routing and copies the data from the source memory to the target memory. Thus, the RAS code must perform multiple memory read or write operations to copy the entire source to the target. Since a memory unit may hold Tera-bytes of data, the copy operation could take several seconds.

Figure 3:
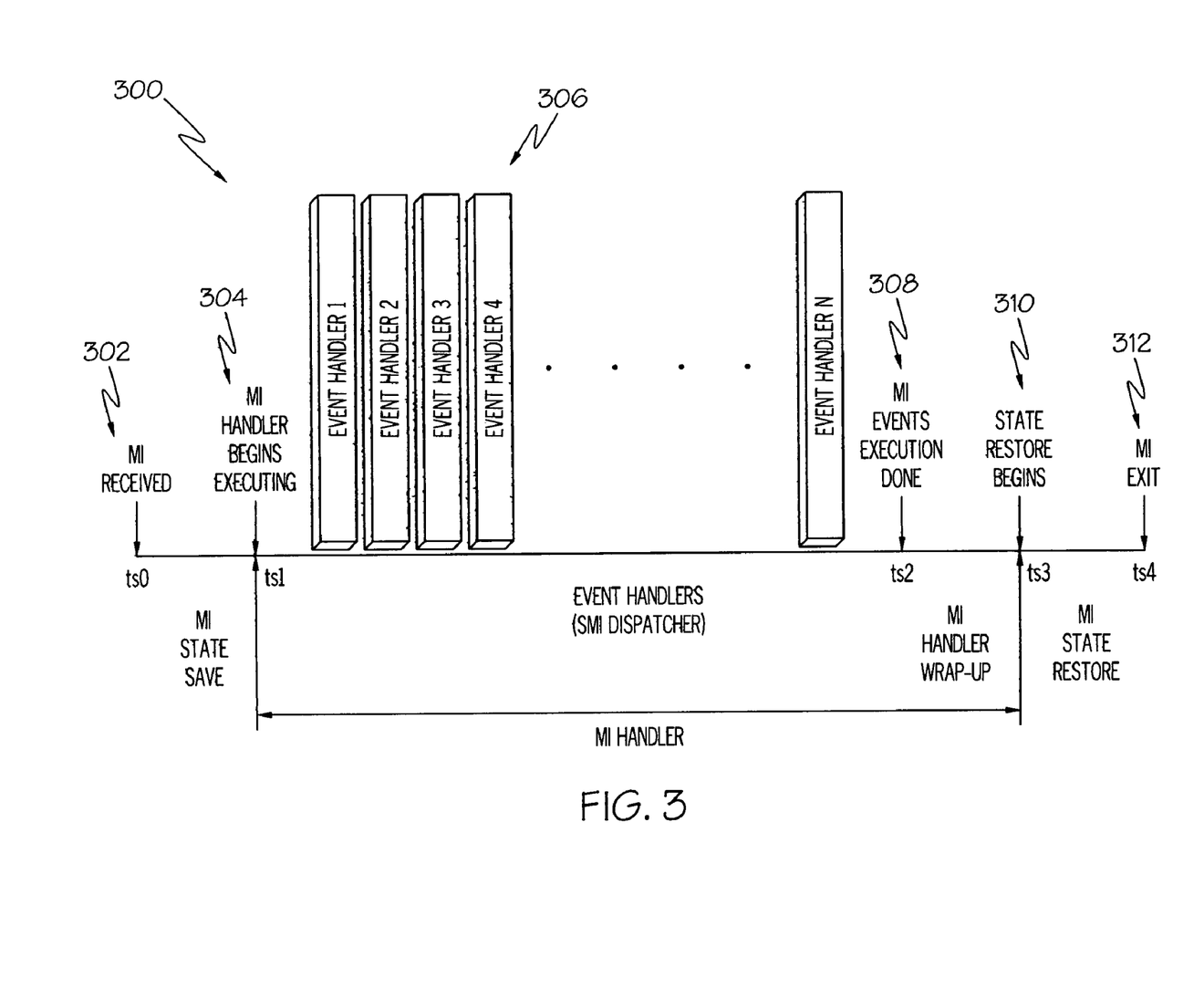
FIG. 3 depicts a time graph for handling RAS events.

This is shown in FIG. 3 which depicts a time graph 300 for indiscriminately handling RAS events. At time ts0 (302) the MI is received by the monarch processor. Between time ts0 and ts1 (304), the state of the system is saved. At time ts1 an MI handler begins operation. The MI handler is RAS code to handle RAS events. Thus, the RAS code performs a sequence of RAS event handling functions (206) between time ts1 and time ts2 (308). Each event to be handled is dispatched to the monarch processor by RAS code referred to as an MI dispatcher. In the memory migration operation of the present example, events include copying data from the source memory to the target memory. Execution of all events that can be executed in the duration of one MI period is finished by time ts2 and the MI event handler wraps up operations by time ts3 (310). Between time ts3 and ts4 (312) the state of the system is restored and the RAS program exits.

Events to be handled during an SMI period may include power management events, emulation of hot plug events, emulation of USB devices, and to read or write video. A power management event is called if a processor, memory or system temperature increases. Such a temperature increase might trigger an MI and the MI event could turn on the fans to cool the system or reduce the frequency or voltage of the system operation to reduce the power consumed. A hot plug event is typically initiated by the user by pressing a button (or inserting a jumper or though software user interface) after inserting a new device (memory or processor or PCI) or after removing a device.

Also if a number of corrected errors generated by a unit of memory is counted by the chipset, then once a preset threshold of memory errors is reached, the chipset could initiate a memory removal request to the OS (to avoid the memory going fatal). As another example, USB devices are typically handled by OS drivers. But a Microsoft DOS legacy operating system does not have drivers for a USB. In this case the MI handler could read the USB devices and emulate the device so that the DOS operating system can be used with USB. Also, it is possible to set a periodic MI to constantly monitor the update, of video information, sending the information through a network for remote monitoring of the video. The video changes are monitored by reading the contents of a video buffer and sending updates through network packets.

A large amount of time during which OS functions are not being performed degrades apparent performance. For example, audio or video quality could suffer. RAS operations such as memory add may take several seconds to complete, whereas a maximum tolerable OS latency period may be on the order of micro-seconds. Thus, a system described herein breaks RAS functions into a plurality of sub-functions to be performed over a period of time in different time intervals. More particularly, events are classified into critical events or non-critical events. Critical events are performed first during a first time interval. Non-critical events are performed in a remaining period of the first time interval or one or more subsequent time intervals.

Critical events may include error handling events, power management events, to name but a few. Critical events are those events deemed to be critical to functionality of the system. These events need to be handled immediately within the same MI period rather than postponing these events to a subsequent MI period. In one embodiment, a classification of each event called by RAS code 112 as critical or non-critical is stored in system memory. The classification determines if the event will be handled as critical or non-critical. Critical events may be those deemed important enough to have priority over non-critical events. Further, one desires critical events to be performed in one MI period. This may not be achieved in every embodiment. Non-critical events are those events that are lesser in priority and could be distributed over more than one MI period. Copying memory would therefore typically be classified as a non-critical event. Memory add, memory copy, and memory replace are typically classified as non critical events, whereas error handling might typically be a critical event.

OS functions may be performed between the time intervals for performing RAS events. Because RAS events are performed in shorter time intervals, ideally no perceivable degradation arising from a prolonged break in the performance of OS functions occurs.

Figure 4:
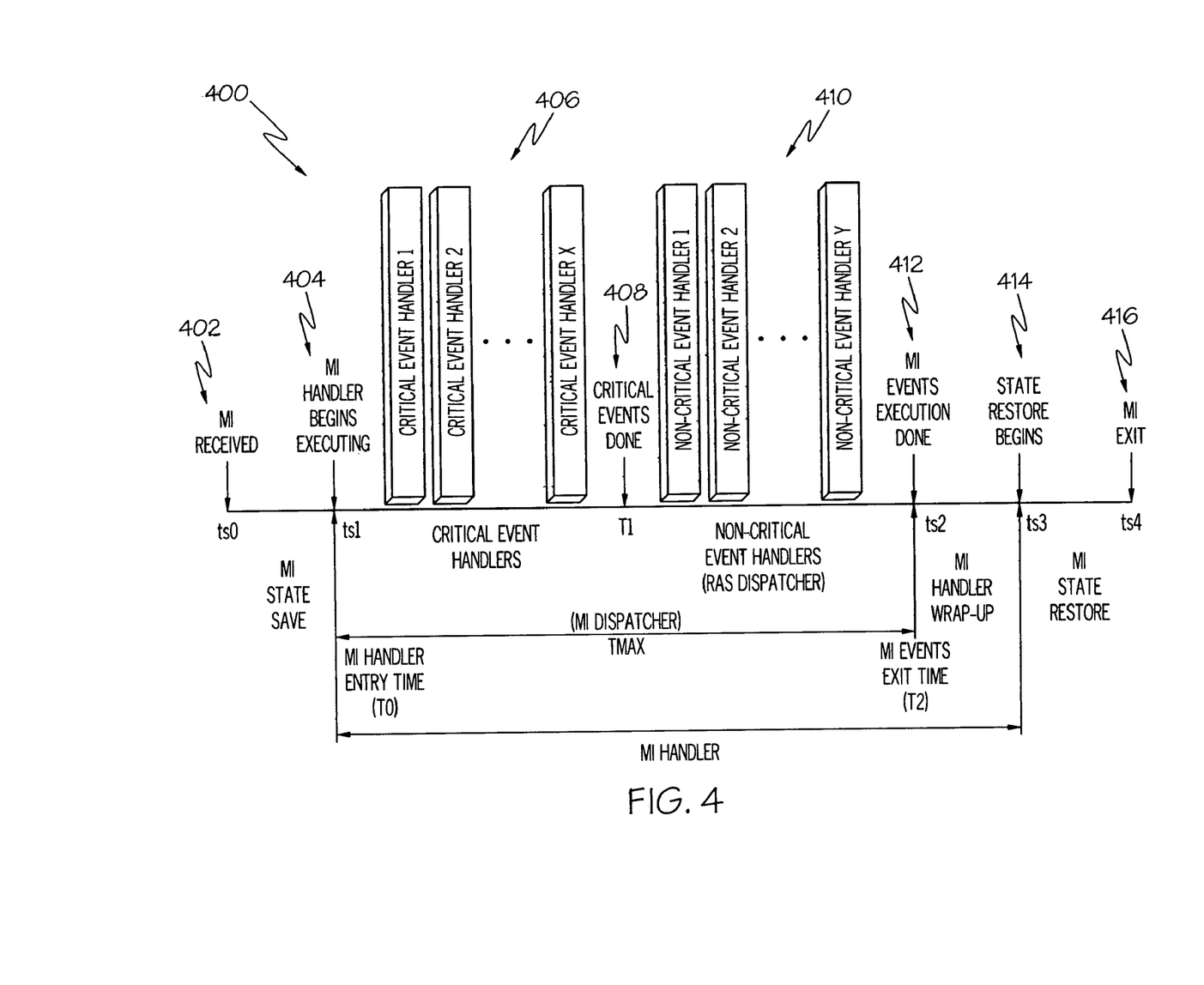
FIG. 4 depicts a time graph for handling RAS events, separating critical events and non-critical events.

FIG. 4 shows an embodiment of a timing diagram 400 for processing critical events followed by processing non-critical events in the same MI period. Between time ts0 (402) and ts1 (404), the state of the system is saved. For example, the registers of processor 140 may be saved in system memory and/or in L2 cache. Between time ts1 and T1 (408), an MI dispatcher, which is part of the RAS code, dispatches critical events (406) to be handled by the MI handler, which is also part of the RAS code. Critical events are completed by time T1 (408). After time T1, and before time ts2 (412), an RAS dispatcher, which is part of the RAS code, dispatches RAS non-critical events (410) to be handled by the MI handler code. Thus, the MI handler code entry time is at ts1 (T0) and the MI handler exit time is at ts2 (T2). Between time ts2 and ts3 (414) the handler code wraps up its operations.

Between time ts3 and ts4 (416) the system state that was saved between time ts0 and ts1 is restored. Thus, the MI dispatcher calls all the critical events and the RAS dispatcher (non-critical event dispatcher) subsequently calls non-critical events. The time Tmax, which is ts2 minus ts1, is the total amount of time allocated for the handling of events. Thus, during the time Tmax, all critical events are performed and some non-critical events may be performed, such that Tmax does not exceed the maximum latency period for OS functions. During a subsequent MI period, more non-critical events can be handled if any remain. Thus, if not all non-critical events can be performed in the remaining time of the current MI period, a subsequent one or more MI periods are scheduled for handling of the remaining non-critical events.

Figure 5:
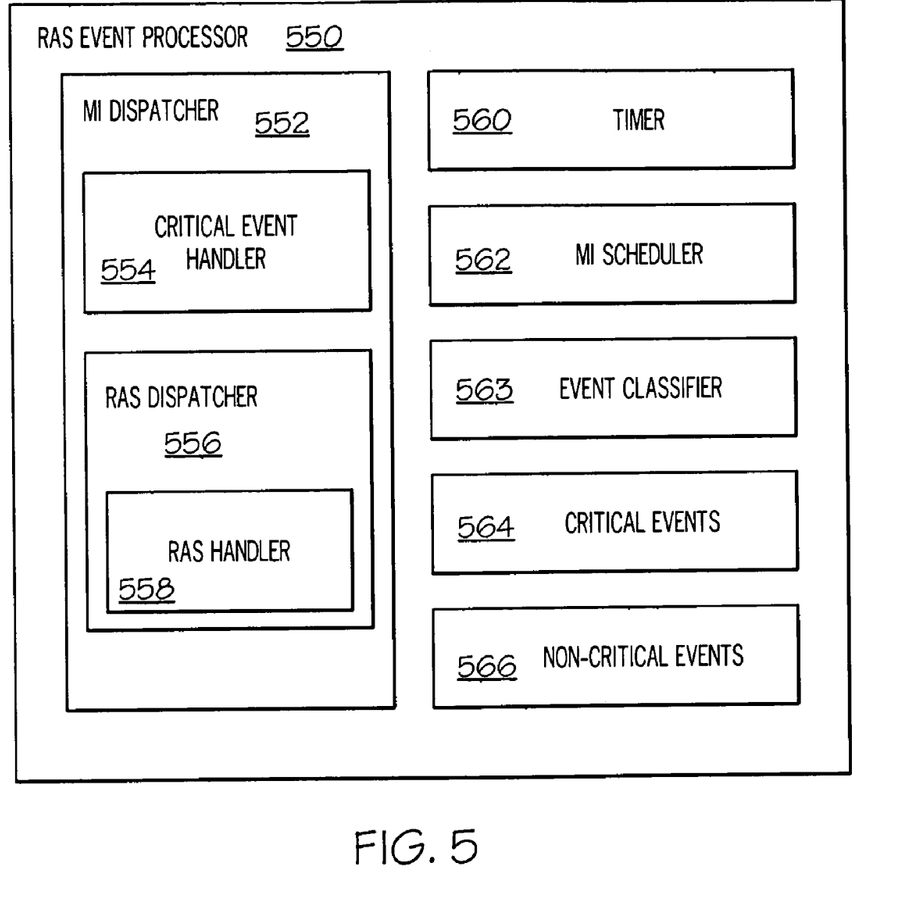
FIG. 5 depicts a functional block diagram of an embodiment of an RAS processor.

FIG. 5 shows a functional block diagram of one embodiment of an RAS event processor 550. Operation of the RAS event processor 550 is triggered by an MI signal generated by hardware. This MI signal may, for example, be a System Management Interrupt (SMI) signal or a Platform Management Interrupt (PMI) signal. Event processor 550 comprises an MI dispatcher 552 for processing RAS events during an MI period. The MI dispatcher comprises a critical event handler 554 and an RAS, dispatcher 556. When an MI signal occurs, RAS event processor 550 stores the current state of the system and selects a processor to be the monarch processor to execute RAS code. RAS event processor 550 stores the current system time T0 and calls the MI dispatcher 552 into operation.

A queue of critical events 564 is stored in memory. A queue of non-critical events 566 is also stored in memory. Events are classified as critical or non-critical by an event classifier 563. In one embodiment, event classifier 563 is computer code that, when executed, determines for a called event whether that event is critical or non-critical. This is done according to a table stored in memory of what types of events there are and whether each event so stored is critical or non-critical. Thus, in one embodiment, each type of event to be handled is classified as critical or non-critical and this collection of type classifications is stored in memory a priori. So in one embodiment, a table of type of event versus classification of event is stored. Accordingly, event classifier 563 associates each event with a code that identifies whether the event is critical or non-critical.

MI Dispatcher 552 comprises a critical event handler 554. Critical event handler 554 executes one or more critical events pending in critical event queue 564. MI dispatcher 552 also comprises an RAS dispatcher 556. When operation of critical event handler 554 completes, RAS dispatcher 556 is called into operation. RAS dispatcher 556 calls a timer 560 to determine the current time T1 and to compute a time T2=T0+Tmax, where Tmax is a maximum tolerable OS latency period. RAS dispatcher 556 determines if there is time available in the current MI period to process non-critical events after the completion of critical events. If so, RAS dispatcher 556 calls an RAS handler 558 into operation. If not, RAS dispatcher 556 calls scheduler 562 to schedule a subsequent MI period to execute non-critical events. RAS handler 558 executes non-critical events pending in non-critical event queue 566 and may call upon timer 560 to monitor the time remaining in the current MI period. RAS handler 558 receives from timer 560 notice when the current MI period is about to expire, T2. At that time, RAS handler 558 determines if any non-critical events remain to be processed. If so, scheduler 562 schedules one or more subsequent MI periods to complete non-critical events that were not completed during the current MI period.

Figure 6:
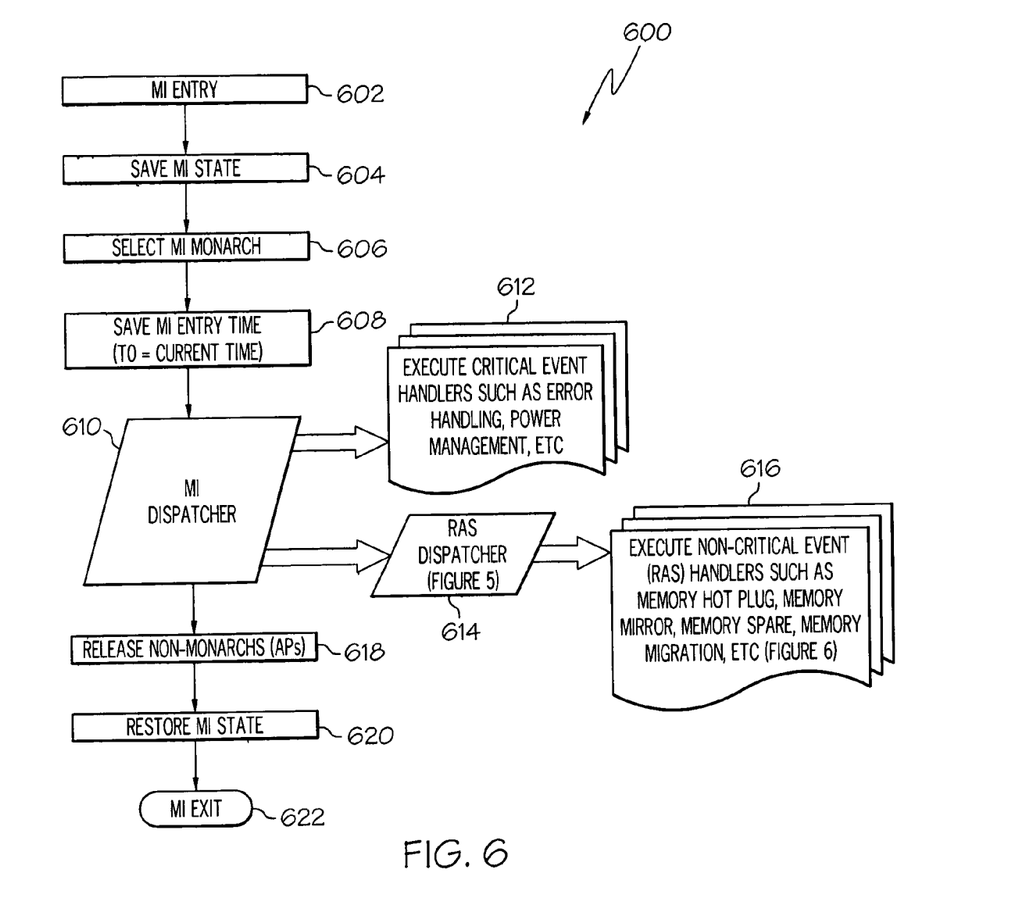
FIG. 6 depicts a flow chart of a Service Management Interrupt (SMI) handler.

FIG. 6 shows a flowchart 600 of an embodiment for handling MI events as performed by RAS code described herein. When an MI occurs, the RAS code is entered (MI entry) (element 602). That is to say, the RAS code begins execution. Upon MI entry, the state of the system is stored (element 604). One of the processor in a multi-processor system is selected as the monarch processor (element 606). In one embodiment, this is always the same processor. In another embodiment, a different processor or the same processor may be assigned to be the monarch processor each time one is called for. The time of MI entry (T0) is saved (element 608). The monarch processor then begins to execute the MI dispatcher code (element 610). During this time, execution of OS code by applications processors may be suspended. Execution of applications system code may also be suspended in some embodiments.

The MI dispatcher code initiates execution of critical event handling, which may include power management events, error handling events and other events deemed to be critical to system operation (element 612). After critical events have been handled, the RAS dispatcher dispatches to the processor non-critical events that may be performed during the maximum tolerable period of OS latency (element 614). The monarch processor then executes non-critical events, which may include Memory Hot Plug (memory add or remove), Memory mirror, Memory migration, etc., (element 616). Upon completion of event handling, the application processors are released for execution of OS code (element 618). The system is then restored to its state that existed prior to MI entry (element 620). The system then exits the RAS code (element 622).

Figure 7:
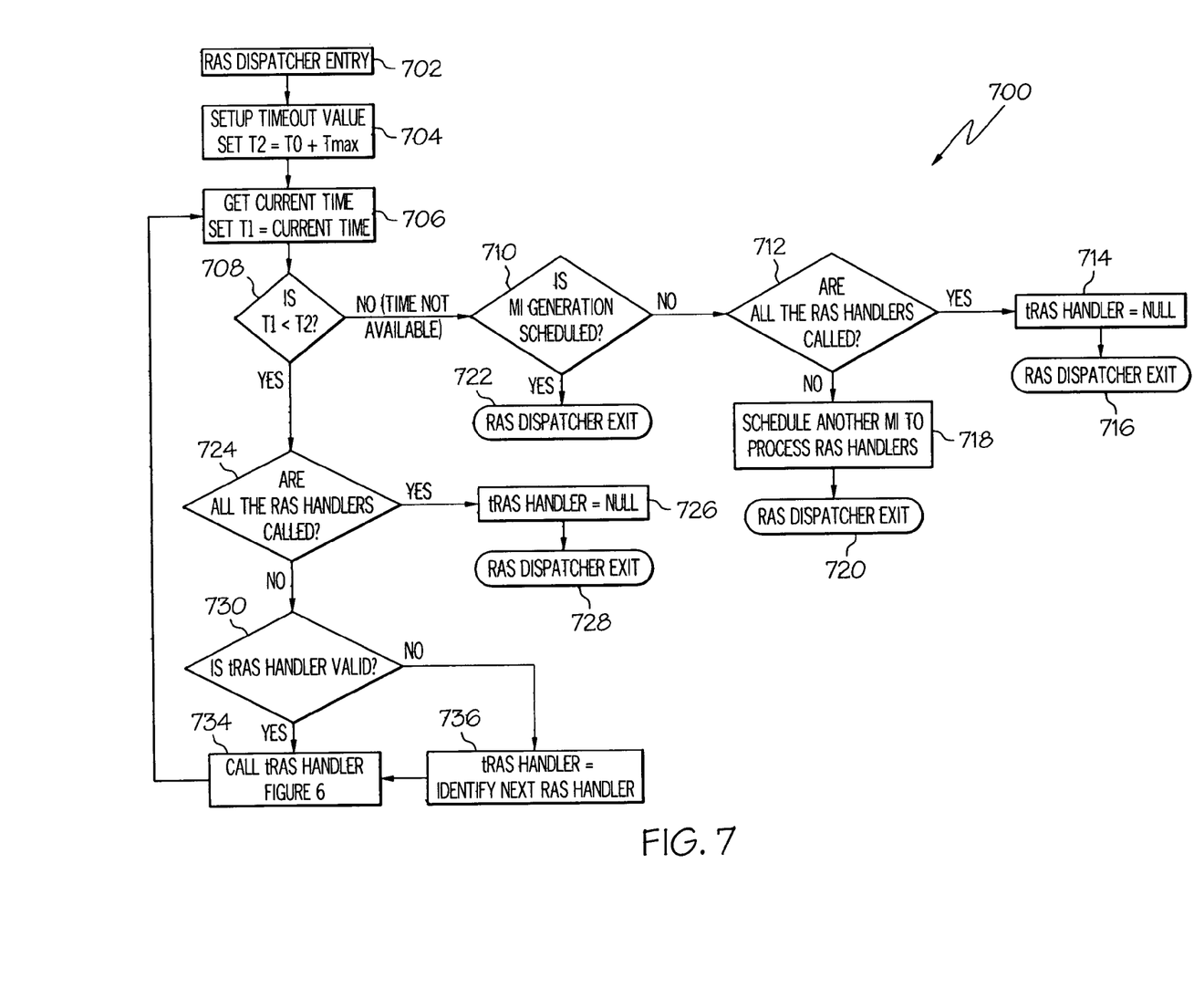
FIG. 7 depicts a flow chart of a Reliability, Availability and Serviceability (RAS) dispatcher.

FIG. 7 shows a flow chart 700 of an embodiment of RAS dispatcher code for handling non-critical events. After critical events have been handled, the system enters the RAS dispatcher (element 702). The RAS dispatcher code then sets up the timeout value (element 704). Referring to FIG. 4, the timeout value is T2=T0+Tmax, where Tmax is the maximum allowable OS latency period. The maximum OS latency period is the maximum time allowable for OS operations to be suspended while handling RAS events. This latency period is chosen to prevent degradation of apparent performance. The RAS dispatcher then gets the current system time and sets T1 equal to the current system time (element 706). The system, operating under RAS dispatcher code, then determines if T1 is less than T2, to determine if there is time to handle any non-critical events (element 708). If T1 is less than T2, then there is time to handle non-critical events. If T1 is not less than T2, then there is not time to handle non-critical events during the current latency period.

If there is not time to handle non-critical events during the current period, the system determines if another MI is scheduled (element 710). If so, then the system exits the RAS dispatcher (element 722). If another MI is not scheduled, then the system determines if all the RAS handlers have been called (element 712). If so, the logical variable tRAS handler is set equal to NULL (element 714). The variable tRAS handler indicates the next RAS handler to be called. Then the system exits the RAS dispatcher program. If not all RAS handlers have been called (element 712), then the system schedules another MI to process the remaining RAS handlers (element 718). Then, the system exits the RAS dispatcher program 720.

If there is time to handle non-critical events (element 708), then the system determines if all RAS handlers have already been called (element 724). If all RAS handlers have already been called, the variable tRAS handler is set to NULL, (element 726), and the system exits the RAS dispatcher (element 728). If not all RAS handlers have been called, (element 724), the system determines if the current value of tRAS is valid (element 730). If not, then the variable tRAS is set to identify the next RAS handler to be executed (element 732). Then, the system calls the next tRAS handler (element 734). When the next tRAS handler is completed, the system continues at element 706.

Figure 8:
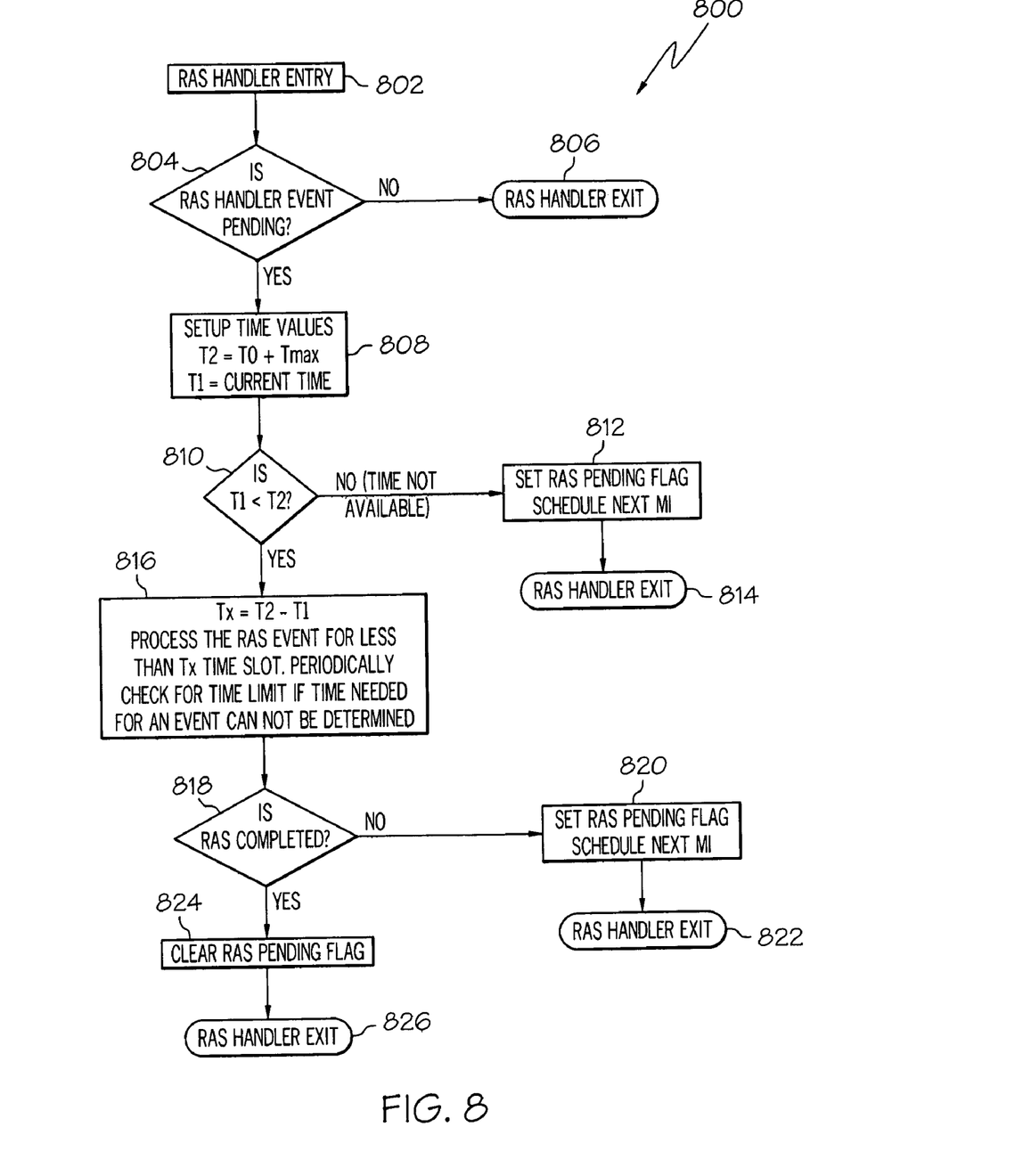
FIG. 8 depicts a flow chart of an RAS handler.

FIG. 8 shows a flow chart 800 of an embodiment of RAS handler code for processing non-critical RAS events. If not all RAS handlers have been called, the system enters execution of the RAS handler code (element 802). The system determines if an RAS handler event is pending (element 804). If not, the system exits the RAS handler (element 806). If an RAS handler event is pending (element 804), the system sets up the time values: T1 equals the current time and T2=T0+Tmax (element 808). If T1 is not less than T2 (element 810), then there is no time to perform the pending RAS event. If T1 is less than T2 (element 810), then time is available to perform the pending RAS event.

If no time is available to execute a pending RAS event, then an RAS pending flag is set and the system schedules a next MI (element 812), and the system then exits the RAS handler (element 814). If T1 is less than T2 (element 810), then a variable Tx is set equal to T2 minus T1 (element 816). Thus, Tx is the time remaining in the OS latency period for handling the pending RAS event. The RAS event will be processed in the time interval T1+Tx. If the duration of execution of the RAS event is not known, the system will periodically determine if time remains for processing the RAS event. If, at T2, the RAS event is not completed (element 818), then the system sets the RAS pending flag and schedules the next MI (element 820). Then the system exits the RAS handler (element 822). If, at T2, the RAS event is completed (element 818), the system clears the RAS pending flag (element 824), and exits the RAS handler (element 826).

Thus, embodiments provide for separating critical events from non-critical events. Critical events are performed in a first period of an MI period. If time remains in the first SMI period after performing critical events, non-critical events are performed until the end of the first MI period. The MI period is scheduled to be not longer than the maximum tolerable OS latency period. If not enough time in the initial MI period remains to complete all non-critical events, then one or more additional MI periods are scheduled to process remaining non-critical events.

Thus, the process involves determining current times and calculating subsequent times. The processor therefore determines a first current time at the time of entry into the RAS code. The time of entry into the RAS code is the time the RAS code begins execution. Once the current time for entry of the RAS code is known, one may compute subsequent times. For example, the time of entry plus the maximum OS latency time gives the time when the current MI period ends. The time remaining in a current MI period is the end time of the current MI period minus the current time. Thus, the processor determines a current time whenever a time remaining is to be computed. The time remaining is needed to determine if sufficient time remains to process at least one non-critical event or at least one step in the processing of the critical event.

If sufficient time remains, then at least one step in the processing of the non-critical event is performed. If sufficient time does not remain to finish processing the non-critical events, the processor schedules at least one subsequent MI period or as many as necessary to finish the processing of all of the non-critical events pending to be called. To this end, a schedule or queue of events to be processed is maintained. A first section of memory can be maintained to store pending critical events. For each pending critical event, the system stores a code that includes the type of the critical event. These codes are stored sequentially in an order pending. In a second section of memory is stored a queue of pending non-critical events. For each pending non-critical event, the system stores a code that includes the type of non-critical event. These codes are stored sequentially in an order pending.

Thus, near the start of an MI period, a processor 140 is instructed to perform critical events. Processor 140 receives a first or subsequent critical event code indicating the type of critical event to be performed. This critical event code indicates what critical event is to be performed and which components will be involved. The processor branches to a starting instruction for executing the critical event indicated by the next pending critical event code. Ideally, all of the critical event instructions are performed by the end of the current MI period. In one embodiment it may not be possible to perform all pending critical events in a single MI period that does not exceed the maximum tolerable OS latency period. In this embodiment, at least one subsequent MI is scheduled so that the remaining critical events can be executed during at least one subsequent MI period.

Upon completion of all pending critical events, the processor executes instructions for completing non-critical events such as a sequence of memory copy operations. In one embodiment, a certain specified number of memory blocks are copied in one MI sub-period. The MI sub-period is that amount of time remaining in an MI period after completion of pending critical events, if any. If the copy of all blocks of memory to be copied is not completed in one MI sub-period, then at least one subsequent MI period is scheduled to complete the copying of all remaining blocks of memory to be copied.

Accordingly, one embodiment is a method for implementing Reliability, Availability and Serviceability (RAS) in a computing system. The method comprises classifying RAS processing events into categories of critical events and non-critical events. Critical events are executed during at least a first part of a first Management Interrupt (MI) period. Non-critical events are executed in an MI sub-period of the first MI period, if any, existing after the completion of critical events. If there is sufficient time in the first MI period to process at least one non-critical event, then the at least one non-critical event is processed in the first MI period. An MI period may be calculated not to exceed a maximum period of Operating System (OS) code latency. Non-critical events may comprise, for example, copying contents of one memory unit to another memory unit or adding a memory unit to be accessed by a processor. Critical events may comprise, for example, activation of a fan in the event of a temperature increase.

Another embodiment is a system for implementing Reliability, Availability and Serviceability (RAS) in a computing system. The system comprises circuitry to generate a Management Interrupt (MI) signal. A processor responsive to the MI signal processes critical events during an MI period initiated by the MI signal and processes non-critical events during a current MI period if time exists during the current MI period for processing the non-critical events. The system may further comprise a timing mechanism to determining a time remaining in an MI period. The system may also comprise a scheduler to schedule a subsequent MI period if time does not exist in a current MI period for processing non-critical events. Note also that in some embodiments not all critical events can be complete in one MI period. Thus, some critical events may be scheduled to be performed in at least one subsequent MI period. Similarly, not all non-critical events may be completed in a sub-period of an MI period. The remaining non-critical events are placed in a queue and processed in one or more subsequently scheduled MI periods.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

Thus, another embodiment of the invention provides a machine readable medium containing instructions effective, when executing by a machine, to cause the machine to perform a series of Reliability, Availability and Serviceability (RAS) events. The operations comprise processing critical events during a first Management Interrupt (MI) period. Non-critical events are processed during the first MI period, if time remains in the first MI period for processing non-critical events. Non-critical events are scheduled to be performed during a subsequent MI period, if time does not remain in the first MI period for processing the non-critical events.

The operations may further comprise determining a time remaining in an MI period to determine if time remains in the MI period for processing non-critical events. The operations may further comprise specifying an MI period not to exceed a maximum period of Operating System (OS) code latency. Critical events may comprise reducing a frequency of operation to reduce consumed power. Critical events may also comprise determining a temperature in proximity to the machine. Non-critical events may comprise copying contents of one memory unit to another memory unit. Non-critical events may also comprise adding a memory unit to be accessed by a processor.

The present invention and some of its advantages have been described in detail for some embodiments. It should be understood that various changes, substitutions and alterations can be made herein without departing from the spirit and scope of the invention as defined by the appended claims. An embodiment of the invention may achieve multiple objectives, but not every embodiment falling within the scope of the attached claims will achieve every objective. Moreover, the scope of the present application is not intended to be limited to the particular embodiments of the process, machine, manufacture, composition of matter, means, methods and steps described in the specification. One of ordinary skill in the art will readily appreciate from the disclosure of the present invention that processes, machines, manufacture, compositions of matter, means, methods, or steps, presently existing or later to be developed are equivalent to, and fall within the scope of, what is claimed. Accordingly, the appended claims are intended to include within their scope such processes, machines, manufacture, compositions of matter, means, methods, or steps.

What is claimed is:

1. A method for implementing Reliability, Availability and Serviceability (RAS) in a computing system, comprising:
    receiving at least one RAS event Management Interrupt (MI) signal to start a first MI period;
    calculating the first MI period not to exceed a maximum period of Operating System (OS) code latency;
    determining whether an RAS event associated with an MI signal is critical or non-critical;
    executing at least one critical event during the first Management Interrupt (MI) period;
    executing at least one non-critical event during the first MI period if time remains in the first MI period to execute the at least one non-critical event; and
    scheduling a second MI period, subsequent to the first, to execute at least one non-critical event if a non-critical event is pending at the end of the first MI period.

2. The method of claim 1, further comprising storing a queue of pending events classified as critical or non-critical.

3. The method of claim 1, wherein calculating the first MI period not to exceed a maximum period of Operating System (OS) code latency comprises identifying a time limit for the MI period.

4. The method of claim 1, further comprising classifying the copying of contents of one memory unit to another memory unit as a non-critical event.

5. The method of claim 1, further comprising classifying an event of adding a memory unit to be accessed by a processor as a non-critical event.

6. The method of claim 1, further comprising scheduling a critical event to be performed during a second MI period.

7. A system for implementing Reliability, Availability and Serviceability (RAS) in a computing system, comprising:
    a Management Interrupt (MI) signal generator to generate an MI signal to signify that an RAS event is pending;
    a memory to store an indicator to indicate whether a pending RAS event is critical or non-critical; and
    a processor responsive to the MI signal to process critical events during the MI period initiated by the MI signal, to calculate the MI period not to exceed a maximum period of Operating System (OS) code latency, and to process non-critical events during the MI period if time exists during the MI period for processing the non-critical events.

8. The system of claim 7, further comprising a timing mechanism to determine a time remaining in the MI period.

9. The system of claim 7, further comprising a scheduler to schedule a subsequent MI period if time does not exist in the MI period for processing non-critical events.

10. The system of claim 7, wherein the processor comprises a dispatcher to compute an exit time based upon an entry time and a maximum tolerable OS latency period to calculate the MI period not to exceed a maximum period of Operating System (OS) code latency.

11. The system of claim 7, wherein a stored indicator is to indicate that copying contents of one memory unit to another memory unit is a non-critical event.

12. The system of claim 7, wherein a stored indicator is to indicate that adding a memory unit to be accessed by a processor is a non-critical event.

13. The system of claim 7, wherein a stored indicator is to indicate that replacing one processor with another is a critical event.

14. An article comprising a machine-readable storage medium that contains instructions, which when executed by a processor, cause said processor to perform operations for implementing Reliability, Availability and Serviceability (RAS) in a computing system, comprising:
    receiving at least one RAS event Management Interrupt (MI) signal to start a first MI period;
    calculating the first MI period not to exceed a maximum period of Operating System (OS) code latency;
    determining whether an RAS event associated with an MI signal is critical or non-critical;
    executing at least one critical event during the first Management Interrupt (MI) period;
    executing at least one non-critical event during the first MI period if time remains in the first MI period to execute the at least one non-critical event; and
    scheduling a second MI period, subsequent to the first, to execute at least one non-critical event if a non-critical event is pending at the end of the first MI period.

15. The machine readable storage medium of claim 14, further comprising determining a time remaining in the first MI period to determine if time remains in the first MI period for processing non-critical events.

16. The machine readable storage medium of claim 14, wherein calculating comprises specifying a latency period not to exceed a maximum period of Operating System (OS) code latency.

17. The machine readable storage medium of claim 14, further comprising obtaining a current system time to subtract from the end time of the first MI period to determine a time remaining in the first MI period.

18. The machine readable storage medium of claim 14, further comprising computing the first MI period end time as the sum of a current time of code entry plus a maximum tolerable OS latency period.

19. The machine readable storage medium of claim 14, further comprising classifying an event of reducing a frequency of operation to reduce consumed power as a critical event.

20. The machine readable storage medium of claim 14, further comprising classifying an event of adding a memory unit to be accessed by a processor as a non-critical event.

* * * * *